United States Patent [19]

Barthelmess

[11] 4,411,411

[45] Oct. 25, 1983

[54] CUTTING TORCH GUIDE ATTACHMENT

[76] Inventor: Casey E. Barthelmess, 222 Lorraine La., Moorpark, Calif. 93021

[21] Appl. No.: 468,360

[22] Filed: Feb. 22, 1983

[51] Int. Cl.³ ............................................. B23K 7/02
[52] U.S. Cl. ........................................ 266/66; 266/70
[58] Field of Search .................................. 266/66, 70

[56] References Cited

U.S. PATENT DOCUMENTS 2,743,101  4/1956  Clark .................................... 266/70
3,514,087  5/1970  Richards .............................. 266/70

FOREIGN PATENT DOCUMENTS 454018  9/1936  United Kingdom ................. 266/66

Primary Examiner—W. Stallard
Attorney, Agent, or Firm—Jack C. Munro

[57] ABSTRACT

An apparatus for attachment to a conventional welding torch which provides a support for the welding torch tip which is to be used in conjunction with a template for making smoothly contoured cuts within a workpiece. The apparatus includes a collar which is to be fixedly securable onto the tip of the welding torch. The collar is pivotally and lineally movable in respect to a plate. A fastener assembly is utilized which secures in position the collar onto the tip of the welding torch and also tightens the collar onto the plate. The lower edge of the plate terminates in a smoothly contoured guide flange which is to rest upon and slide on the upper surface of a template. Attached to the plate and extending outwardly past the guide flange is a pin. The pin is to abut against the side edge of the template.

5 Claims, 4 Drawing Figures

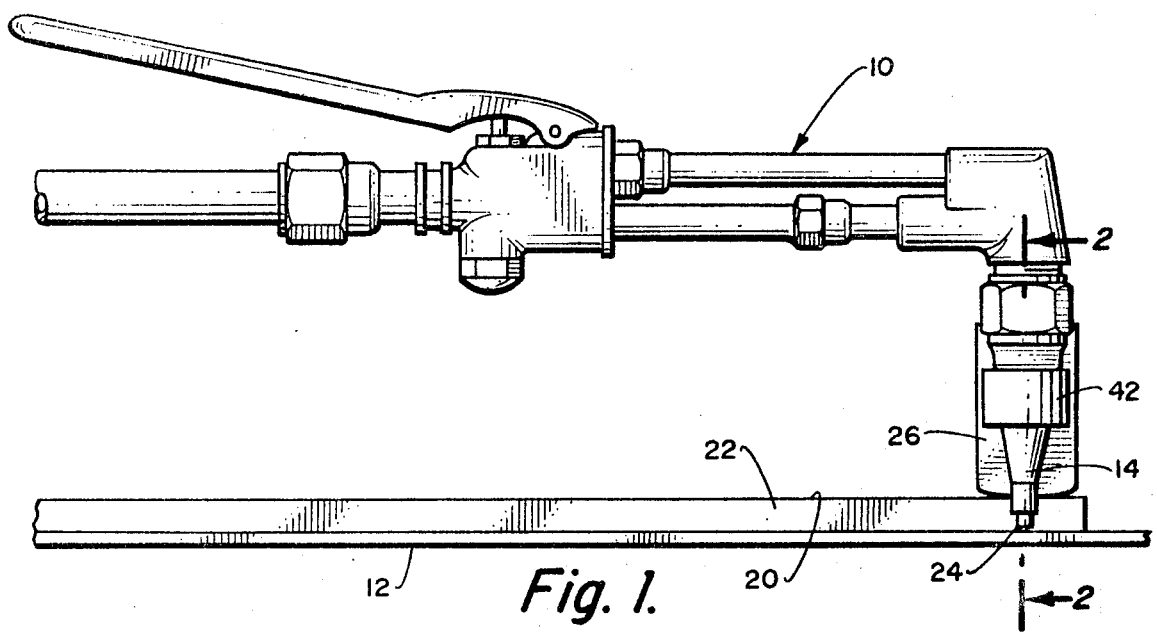
Fig. 1.
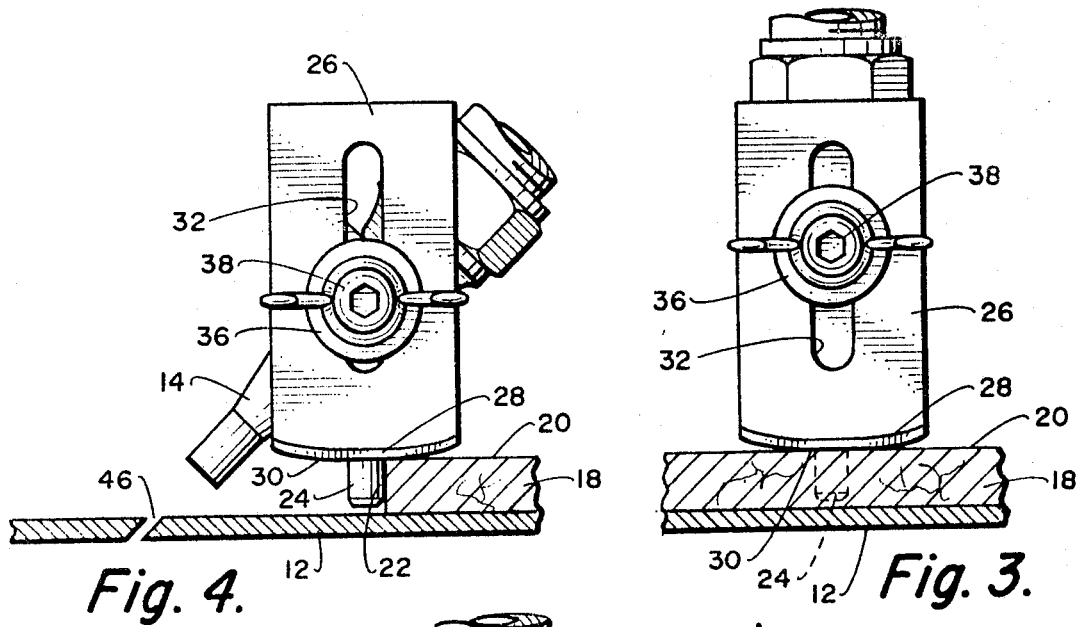
Fig. 4.
Fig. 3.
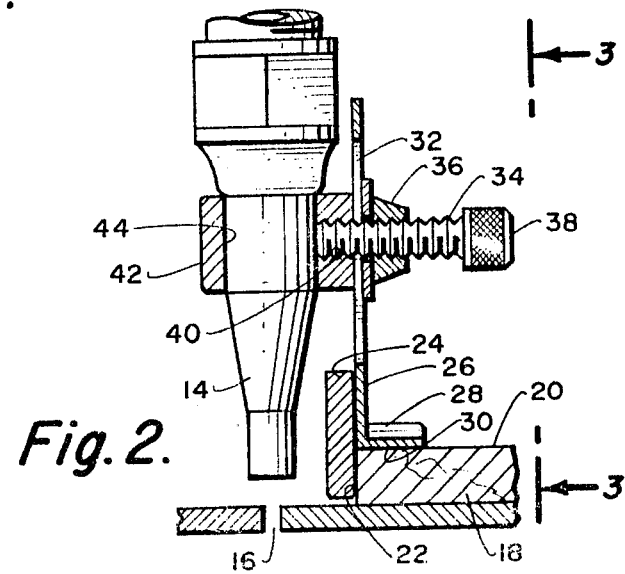
Fig. 2.

CUTTING TORCH GUIDE ATTACHMENT

BACKGROUND OF THE INVENTION

The field of this invention is directed to a device for use on a gas type of metal cutting torch for the purpose of effectively guiding same when making straight line and other smoothly contoured cuts in a workpiece.

It has long been recognized that it is extremely difficult for even the most skilled welder to accurately cut a straight or curved line in metal workpieces by simple free hand movement of the cutting tip of a gas torch relative to the workpiece. This problem has long been realized and has manifested itself in attempted solutions such as those shown in the following patents:

U.S. Pat. No. 2,743,101—Clark
U.S. Pat. No. 3,514,087—Richards
U.S. Pat. No. 3,804,391—Case
U.S. Pat. No. 4,157,814—Miller
U.S. Pat. No. 4,283,043—Kalian In the aforementioned prior art patents, there has been disclosed an attachment to a cutting torch in which the tip of the cutting torch is to be moved relative to the workpiece to facilitate forming of an accurate cutting path. While these prior art devices are certainly an improvement over free hand cutting, they are generally far too complex than what is required. Complexity increases manufacturing costs and normally also significantly increases the physical size of the attachment. It is desirable to construct an attachment which is small in size and can be readily located within any welders toolbox and also can be purchased quite inexpensively, therefore making it accessible to all individuals regardless of their economic status.

SUMMARY OF THE INVENTION

The cutting tool attachment of this invention takes the form of a collar which has a through opening. The tip of the welding torch is to be located through the through opening in a close fitting manner. The collar is connected by means of a threaded fastener assembly to a plate. The fastener assembly extends through an elongated slot formed within the plate. The fastener assembly includes two separate fasteners. One fastener extends through into the through opening and is to be used to fixedly secure the position of the collar onto the tip of the cutting torch. The other fastener assembly is to fixedly secure the plate in position in respect to the collar. Both fasteners are to be manually operated. Attached to the lower edge of the plate, and extending laterally therefrom, is a flange. The flange has a lowermost, or outer, surface that is slightly arcuate. The flange is to rest against the upper surface of a template. Attached to the plate and extending outward past the flange is a pin. The pin is to rest against the side edge of the template which is the surface which is to be used as the guiding surface for the movement of the cutting torch.

One object of the present invention relates to an attachment for a cutting torch so that the cutting torch can be moved accurately along the cutting path which can be a straight line, a curved line, or any combination thereof.

Another objective of the present invention is to provide an attachment for a cutting torch which is an independent integrated unit in relation to the torch which is readily attachable to and detachable from the tipe of the cutting torch.

It is another object of the present to provide an attachment for a cutting torch which facilitates operation of the torch to produce accurate curved lines, straight lines and bevel cuts.

Another objective of this invention is to provide an attachment for a cutting torch which is capable of being operated and adjusted without separate tools of any kind.

Another objective of this invention is to construct an attachment for a cutting torch which is non-complex in construction and can be manufactured inexpensively.

Another objective of this invention is to construct an attachment for a cutting torch which is small in size and therefore can be readily contained within a conventional tool box.

BRIEF DESCRIPTION OF THE DRAWING

FIG. 1 is a side elevational view of the attachment of the present invention showing such mounted in conjunction with a cutting torch;

FIG. 2 is a cross-sectional view through the tip of the cutting torch and the attachment of the present invention taken along line 2—2 of FIG. 1;

FIG. 3 is an end elevational view of the tip of the cutting torch with the attachment of the present invention being mounted thereon taken along line 3—3 of FIG. 2; and FIG. 4 is a view similar to FIG. 3 but showing the cutting torch in a position to make a bevel cut in the workpiece.

DETAILED DESCRIPTION OF THE SHOWN EMBODIMENT

Referred particularly to the drawing, there is shown a conventional gas cutting torch 10 which is to be utilized to effect cutting of a workpiece which is in form of a metal plate 12. The cutting torch 10 has a cutting torch tip 14.

Located on the metal plate 12 and spaced a predetermined distance from the cut 16, is a template which is shown to be in the form of an elongated bar 18. The elongated bar 18 has an upper surface 20 and a side edge 22. The bar 18 will normally merely rest on the metal plate 12 and can be readily moved by the operator. It is also to be understood that the side edge 22 represents the shape of the cut 16 that is to be produced. In the present instance, the side edge 22 is shown to be a straight plane. Therefore, the cut 16 will constitute a straight line. However, if the side edge 22 were other than a straight plane, such as a curved surface, the cut 16 would then represent a similar type of curve.

Located against the side edge 22 is a pin 24. The pin 24 is to remain in continous contact with the side edge 22 as it is moved therealong. The pin 24 is fixedly secured to a plate 26.

The lower edge of the plate 26 has attached thereto and extending at a right angle therefrom, a flange 28. The flange 28 has a lower surface 30. The lower surface 30 is defined as being arcuate and actually convex with respect to the upper surface 20. Although the lower surface 30 is defined as being arcuate, in actuality it has a planar center section with up-turned ends. The reason for the planar center is that it is desirable to have a flat section in contact with the flat upper surface 20 as it is moved along the upper surface 20. This tends to prevent wobbling of the torch 10 during making of the cut of the cut 16. The reason for the up-turned ends of the flange 28 is that if the flange 28 comes into contact with a burr or other kind of slightly raised structure on the upper surface 20, the lower surface 30 will tend to slide over the raised section.

Formed within the body of the plate 26 is an elongated slot 32. Extending through the slot 32 is a threaded fastener 34. Threadably received on the threaded fastener 34 is a wing nut 36. The outer end of the threaded fastener 34 connects to an enlarged head 38.

The inner end of the threaded fastener 34 connects within a threaded opening 40 formed within a collar 42. The collar 42 has a through opening 44. The tip is to be located in a close fitting manner within the through opening 44. The inner end of the threaded fastener 34 connects with the through opening 44. With the tip 14 in its proper position within the through opening 44, the threaded fastener 34 can then be tightened against the tip 14 thereby securing in position the collar 42 onto the tip 14.

The collar 42 can be positioned at various angular positions in respect to the tip 14 depending upon the particular requirements in order to produce a particular type of cut 16. For example, within FIGS. 1, 2 and 3, the collar 42 is mounted on the tip 14 so that the plate 26 is laterally displaced to one side of the welding torch 10. This lateral displacement is desirable in order to produce the cut 16. However, if the plate 26 is located to the front of the welding torch 10, such as shown in FIG. 4, the welding tip 14 can be oriented to produce a bevel cut 46. The bevel cut 46 is produced by inclining at approximately 45 degrees the longitudinal center axis of the tip 14 in respect to the plane of the metal sheet 12. This inclination of the tip 14 is achieved by tilting of the collar 42 in respect to the plate 26. Whatever the established position of the collar 42, it is to remain in the established position by tightening the wing nut 36.

What is claimed is:

1. In combination with a cutting torch, said cutting torch having a cutting torch tip, a cutting torch attachment for supporting said cutting torch tip in a desired relation to a workpiece while using said cutting torch to cut the workpiece, said attachment comprising:

a collar having a through opening, said cutting torch tip to be located within said through opening in a substantially close fitting manner;

a plate having a substantially planar body, said collar being connected to said plate by a plate fastener assembly, said planar body having a substantially planar guide flange, said guide flange having an outer surface, said guide flange extending substantially perpendicular from said planar body; and a pin attached to said planar body directly adjacent said guide flange, said pin extending outwardly past said outer surface, whereby said pin is to abut against a side edge of a template with said outer surface resting on the top surface of the template and the user is to move said attachment along the side edge with the cutting torch producing a smoothly contoured cut within the workpiece duplicating the contour of the movement of said pin along said side edge of the template.

2. The combination as defined in claim 1 wherein:

said plate having an elongated slot, said collar being pivotly adjustable in respect to said plate and fixable in position to said plate by said plate fastener assembly, a portion of said plate fastener assembly extending through said slot.

3. The combination as defined in claim 2 wherein:

a collar fastener assembly being connected to said collar, said collar fastener assembly being movable to fix the position of said collar on said cutting torch tip.

4. The combination as defined in claim 3 wherein:

said collar fastener assembly being incorporated with said plate fastener assembly.

5. The combination as defined in claim 1 wherein:

said outer surface of said guide flange being arcuate to facilitate the movement of said guide flange along the surface of the template.

* * * * *